(12) United States Patent
Easton

(10) Patent No.: US 7,275,457 B2
(45) Date of Patent: Oct. 2, 2007

(54) CONTROL LEVER WITH PARTIALLY ENCLOSED ROTARY WHEEL

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/496,706

(22) Filed: Jul. 31, 2006

(65) Prior Publication Data

US 2007/0000344 A1    Jan. 4, 2007

Related U.S. Application Data

(63) Continuation of application No. 10/870,246, filed on Jun. 17, 2004, now abandoned.

(51) Int. Cl.
*B60K 17/04* (2006.01)
*B60K 17/12* (2006.01)

(52) U.S. Cl. .................... 74/473.12; 74/473.1

(58) Field of Classification Search ............ 74/473.12, 74/543, 548, 335, 471 XY, 473.1
See application file for complete search history.

(56) References Cited

U.S. PATENT DOCUMENTS

| | | | |
|---|---|---|---|
| 2,611,042 A | 9/1952 | De Napoli, Jr. .............. 179/178 |
| 2,787,746 A * | 4/1957 | Redmond .................... 318/580 |
| 3,867,600 A | 2/1975 | Phillips ....................... 200/157 |
| 4,105,882 A | 8/1978 | Ulbing et al. ................ 200/157 |
| 4,710,599 A | 12/1987 | Motodate et al. ......... 200/61.85 |
| 4,896,558 A | 1/1990 | Meier et al. ................... 74/543 |
| 5,749,577 A * | 5/1998 | Couch et al. ............ 273/148 B |
| 6,145,401 A | 11/2000 | Brush et al. .............. 74/473.12 |
| 6,178,841 B1 | 1/2001 | Ruckert et al. ........ 74/471 XY |
| 6,404,187 B1 | 6/2002 | Ruckert .................... 324/207.2 |
| 6,892,597 B2 * | 5/2005 | Tews ..................... 74/471 XY |
| 2005/0034549 A1* | 2/2005 | Braud ........................ 74/473.1 |

FOREIGN PATENT DOCUMENTS

DE    2049 390    4/1972

* cited by examiner

*Primary Examiner*—Richard Ridley
*Assistant Examiner*—James Pilkington

(57) ABSTRACT

A control lever assembly having a moveable lever and a knob mounted on an end of the lever. The knob has a hollow housing which is removably attached to a cylindrical base. The housing has a cylindrical side wall which forms an opening. A wheel is received in and partially enclosed by the housing for rotation therein. A portion of the housing completely surrounds an outer surface of one end of the wheel. A rotary encoder generates a rotary position signal and is coupled to the wheel by a stiff wire or shaft. The shaft extends through the wheel to a first end which is received by an alignment recess formed on an inner surface of the housing and to a second end which is coupled to the encoder. The shaft extends through a bore in the base and through a bore in the lever.

4 Claims, 2 Drawing Sheets

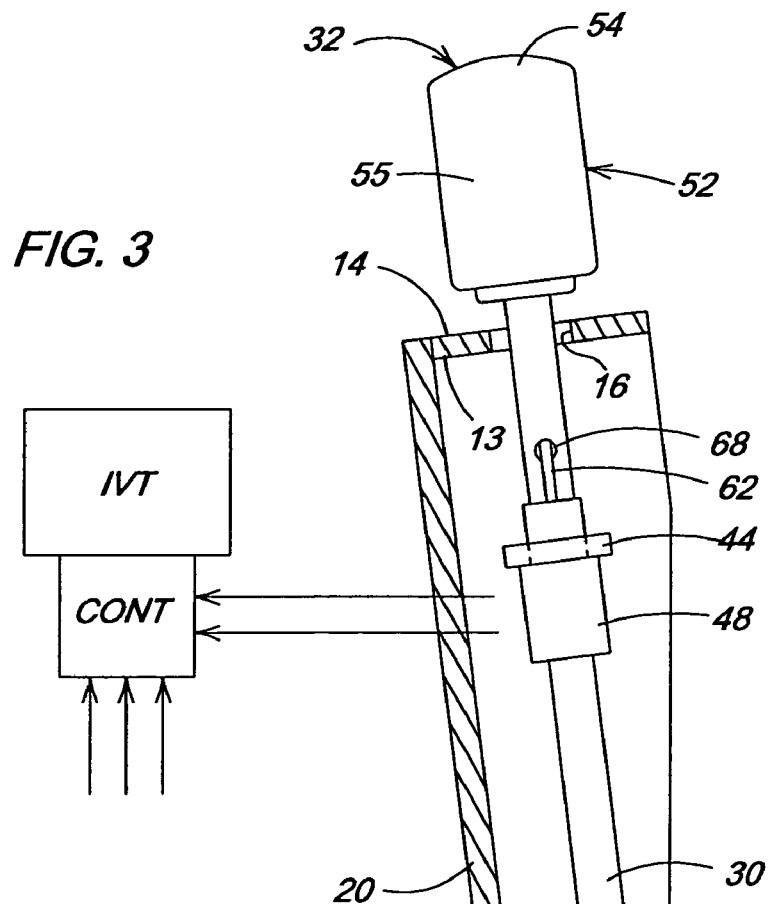
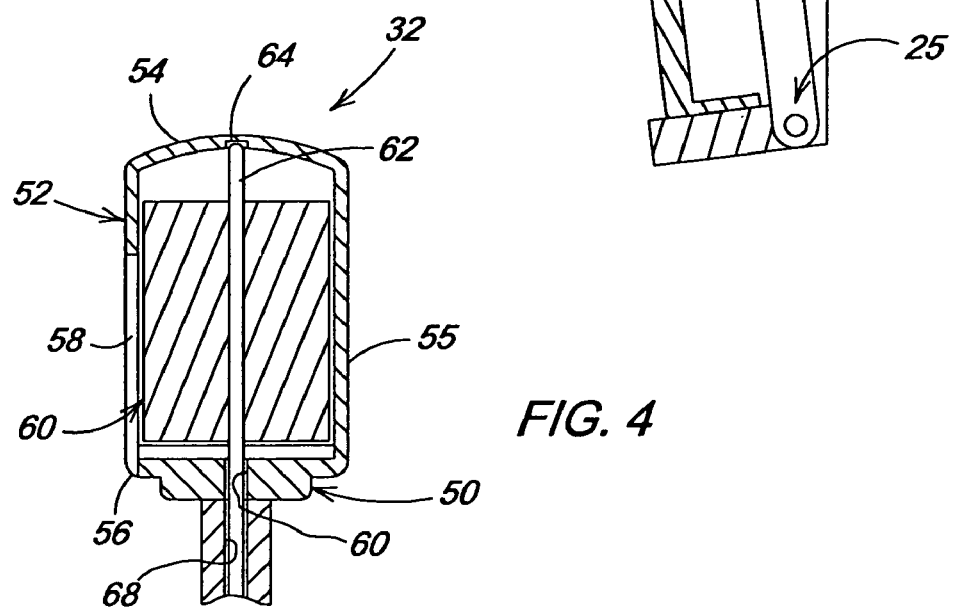

CONTROL LEVER WITH PARTIALLY ENCLOSED ROTARY WHEEL

This is a continuation of Application No. 10/870,246, filed 17 Jun. 2004, now abandoned.

BACKGROUND

The present invention relates to a control lever mechanism, such as a speed control lever for an infinitely variable transmission (IVT).

Production John Deere 20 Series tractors with an IVT include a speed control lever with a rotary wheel, and such a control lever assembly for an IVT is described in U.S. Pat. No. 6,404,187, issued in 2002 to Dieter Ruckert. In this control lever assembly, the rotary wheel is mounted near the upper end of a lever housing. The wheel projects laterally from a side of the housing and is rotatable about a substantially horizontal axis which is transverse with respect to an axis of the lever. The housing must be large enough to allow an operator's hand to grip the housing in the area below the wheel and so that the operator's thumb can manipulate the wheel. But, such a large control lever assembly will be too large for use in more compact control modules, such as an armrest control console.

SUMMARY

Accordingly, an object of this invention is to provide a compact control lever assembly.

A further object of the invention is to provide such a control lever assembly which can be used in an armrest control console.

These and other objects are achieved by the present invention, wherein a control lever assembly has a moveable lever and a knob mounted on an end of the lever. The knob has a hollow housing which is removably attached to a cylindrical base. The housing has a cylindrical side wall which forms an opening. A wheel is received in the housing for rotation therein about an axis which is parallel to an axis of the lever. A rotary encoder generates a rotary position signal and is coupled to the wheel by a stiff wire or shaft. The shaft extends through the wheel to a first end which is received by an alignment recess formed on an inner surface of the housing and to a second end which is coupled to the encoder. The shaft extends through a bore in the base and through a bore in the lever.

BRIEF DESCRIPTION OF THE DRAWINGS

FIG. 3 is a partially sectional view taken along lines 3-3 of FIG. 1; and

FIG. 4 is an enlarged side view of a knob portion of the lever assembly of FIG. 1.

DETAILED DESCRIPTION

Figure 1:
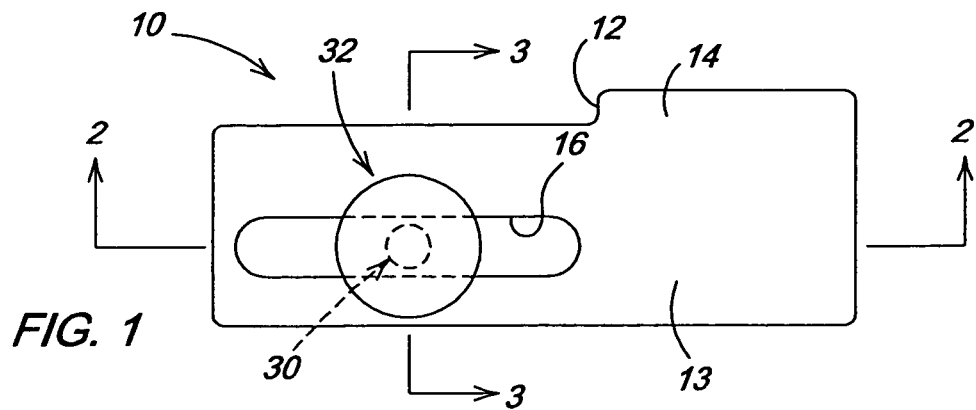
FIG. 1 is a top view of a lever assembly according to the present invention.
Figure 2:
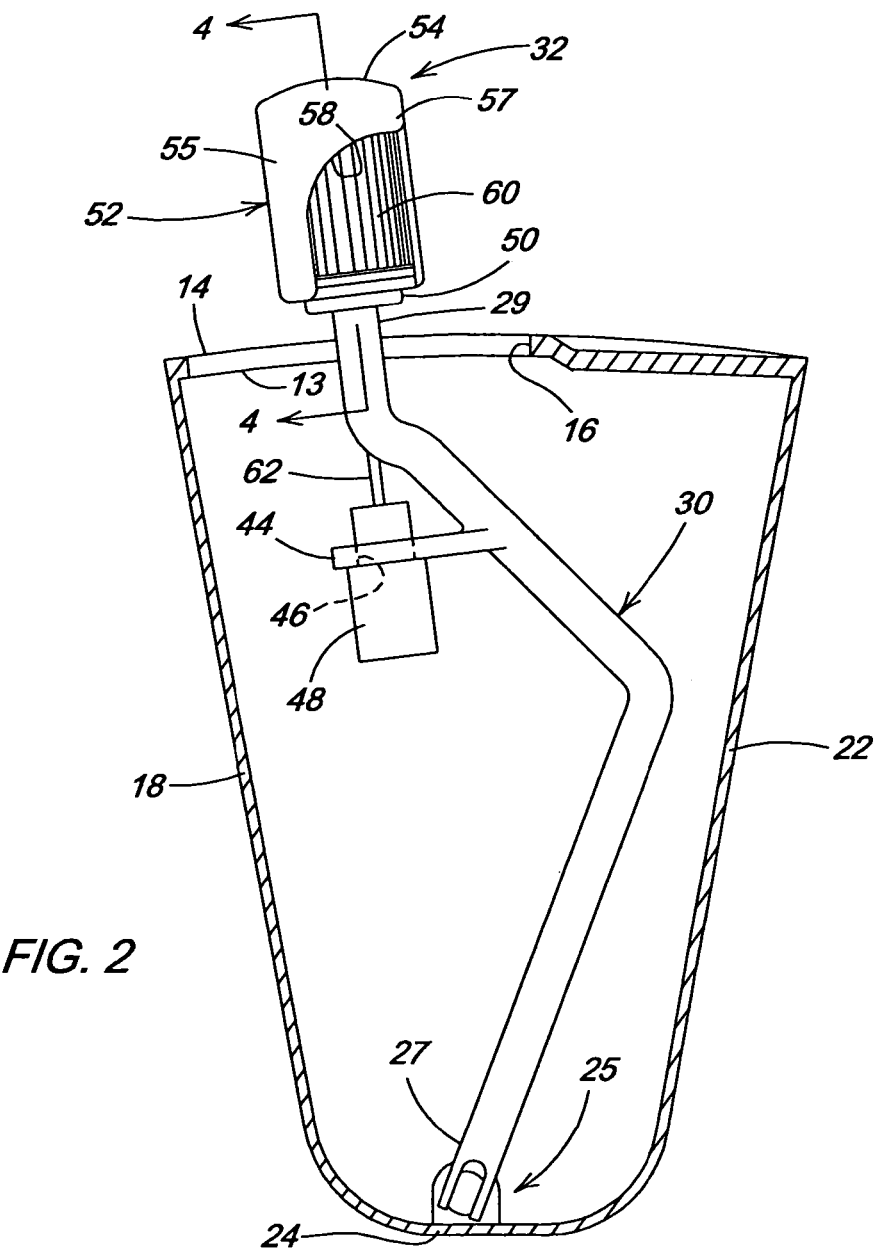
FIG. 2 is a partially sectional view taken along lines 2-2 of FIG. 1.

Referring to FIGS. 1, 2 and 3, a speed lever assembly 10 includes a housing 12, such as forms part of an armrest (not shown) in a vehicle. The housing 12 includes a guide plate 13 with an upper surface 14 and in which is formed a conventional shift lever gate or slot 16. The housing includes front wall 18, side wall 20, rear wall 22 and base 24. A lever 30 has an inner end 27 pivotally coupled to the base 24 at pivot 25, and an outer end 29 which projects substantially radially away from pivot 25 and is slidably received in the slot 16. The ends 27 and 29 define a main axis of the lever 30 which extends radially away from pivot 25. A knob assembly 32 is mounted on the outer end of lever 30. The assembly 10 may be used as a control input for a transmission, such as an infinitely variable transmission.

As best seen in FIGS. 2 and 3, a support arm 44 projects from lever 30 substantially perpendicular to an axis of end 29. Arm 44 includes a bore 46 which receives a conventional rotary encoder 48, such as an optical encoder.

As best seen in FIGS. 2, 3 and 4, knob assembly 32 includes a cylindrical base plate 50 which is fixed to an end of the lever 30. Assembly 32 also includes a generally cylindrical hollow outer housing 52 with a smoothly curved top surface 54 and cylindrical side wall 55. Housing 52 has an open end 56 which is removably attached to base 50, preferably in a snap fit manner. An opening 58 is formed in the housing 52 and extends less than 180 degrees in angular extent. As a result, more than half of the wheel 60 is enclosed by the housing 52.

A cylindrical rotary wheel 60 is received in and partially enclosed within the housing 52. Wheel 60 preferably has a knurled outer surface, is mounted for rotation in the housing 52 and is retained therein by the base 50 and the side wall 55. The inside diameter of the side wall 55 is slightly larger than the outer diameter of the wheel 60. Housing 52 forms a lip 57 which defines an end of the opening 58 and which covers an end of the wheel 60, so that the housing or side wall completely surrounds an outer surface of one end of the wheel 60. Wheel 60 rotates about an axis which is substantially parallel to an axis of the upper end of the lever 30.

The wheel 60 is preferably plastic and is molded onto a thin rigid wire or shaft or coupling member 62. The wire 62 extends though wheel 60 to a first end which is received by an alignment recess 64 formed in the center of an inner surface of the housing top 54. The wire 62 also extends through a central bore 66 in base 50 and through central bore 68 in lever 30 to a second end which is coupled to the rotary encoder 48. As a result, rotation of wheel 60 causes rotation of the sensing element (not shown) of encoder 48 so that encoder 48 will generate signals representing the position and rotation of wheel 60. These signals can be used as set speed signals in a transmission control system (not shown) in a known manner.

Thus, an operator can rest his or her hand on the top of the knob 32 or can grasp knob 32 with the fingers and move lever 30 within the slot 16 without actuation of wheel 60. Or, while the hand is on the top of knob 32, the operator can also manipulate and rotate wheel 60 with the thumb or one or more fingers through the opening 58. The operator need not place his hand on or below the housing side wall 52, and, as a result, the knob 32 can be positioned close to the upper surface 14 of the guide plate 13.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A control lever assembly comprising:
a lever housing having a floor, a guide plate and walls extending between the floor and the guide plate, the guide plate having a slot therein;
a lever movable in and extending through the slot, the lever having a first end pivotally coupled to the floor and a second end projecting away from the first end;
a knob having a non-rotatable base fixed to the second end of the lever and a hollow non-rotatable knob housing mounted on the base, the hollow knob housing having a top surface upon which an operator can rest a portion of the operators hand, and the knob housing having a cylindrical side wall which extends from the upper surface to the base;
a control wheel rotatably mounted in the knob housing, the knob and the control wheel being positioned above an upper surface of the guide plate so that the control wheel can be manipulated by the operator while a portion of the operators hand is resting on the top surface of the hollow knob housing, the knob housing forming a lip attached to the top surface and entirely surrounding an axial upper end of the control wheel, and the side wall having an opening therein which exposes a portion of the control wheel for manipulation by an operator's finger;
a rotary encoder; and
a coupling member which couples the wheel to the encoder, the coupling member extending through the guide plate, and the guide plate being located between the wheel and the encoder.

2. The control lever assembly of claim 1, wherein:
the coupling member extends through a bore in the base.

3. The control lever assembly of claim 1, wherein:
the coupling member extends through the wheel and through a bore in a portion of the lever.

4. A control lever assembly comprising:
a lever housing having a floor, a guide plate and walls extending between the floor and the guide plate, the guide plate having a slot therein;
a lever movable in and extending through the slot, the lever having a first end pivotally coupled to the floor and a second end projecting away from the first end;
a knob having a non-rotatable base fixed to the second end of the lever and a hollow non-rotatable knob housing mounted on the base, the hollow knob housing having a top surface upon which an operator can rest a portion of the operators hand, and the knob housing having a cylindrical side wall which extends from the upper surface to the base;
a control wheel rotatably mounted in the knob housing, the knob and the control wheel being positioned above an upper surface of the guide plate so that the control wheel can be manipulated by the operator while a portion of the operators hand is resting on the top surface of the hollow knob housing, the top surface of the knob housing entirely surrounding an axial upper end of the control wheel, and the side wall having an opening therein which exposes a portion of the control wheel for manipulation by an operator's finger;
a rotary encoder; and
a coupling member which couples the wheel to the encoder.

* * * * *